United States Patent [19]

Raab et al.

[11] Patent Number: 4,864,308

[45] Date of Patent: Sep. 5, 1989

[54] FREQUENCY-SCANNING RADIOMETER

[75] Inventors: Anthony R. Raab, Waterloo; William Thorpe; Thomas P. G. Healy, both of Cambridge, all of Canada

[73] Assignee: Com Dev Ltd., Cambridge, Canada

[21] Appl. No.: 119,717

[22] Filed: Nov. 12, 1987

[30] Foreign Application Priority Data

Jul. 16, 1987 [CA] Canada .................. 542293

[51] Int. Cl.⁴ .............................................. G01S 3/02
[52] U.S. Cl. .................................... 342/351; 342/157; 342/375
[58] Field of Search ............. 342/157, 158, 351, 354, 342/368, 371, 372, 375; 364/517, 423

[56] References Cited

U.S. PATENT DOCUMENTS

| | | | |
|---|---|---|---|
| 3,911,435 | 10/1975 | Marden et al. | 342/351 |
| 4,034,374 | 7/1977 | Kruger | 342/157 |
| 4,081,679 | 3/1978 | Cohn | 342/351 |
| 4,118,703 | 10/1978 | Williams | 342/157 |
| 4,178,100 | 12/1979 | Levis | 342/351 |
| 4,276,551 | 6/1981 | Williams et al. | 342/372 |
| 4,347,515 | 8/1982 | Hoover Jr. | 342/351 |
| 4,356,462 | 10/1982 | Bowman | 333/128 |
| 4,511,897 | 4/1985 | Lindner | 342/351 |
| 4,549,183 | 10/1985 | Farina | 342/157 |
| 4,605,931 | 8/1986 | Mead et al. | 343/700 MS |
| 4,626,858 | 12/1986 | Copeland | 342/374 |
| 4,652,879 | 3/1987 | Rudish et al. | 342/371 |
| 4,654,666 | 3/1987 | Wiley | 342/351 |
| 4,724,439 | 2/1988 | Wiley et al. | 342/351 |
| 4,766,437 | 8/1988 | Schmidt et al. | 342/368 |

Primary Examiner—Thomas H. Tarcza
Assistant Examiner—John B. Sotomayor
Attorney, Agent, or Firm—Daryl W. Schnurr

[57] ABSTRACT

An electronically scanned radiometer has a dispersive serpentine antenna with one or two ports. A mixer is connected to each port with each mixer being fed by a variable frequency local oscillator. Each oscillator provides the mixer to which it is connected with a drive signal that varies in frequency. The antenna most efficiently receives one or more beams through radiators at an angle that varies with the frequency of the drive signal at the mixer. An output is received at each port and is appropriately displayed. When the serpentine has two ports the radiometer can be operated at two orthogonal polarizations. The frequency being fed to each mixer can be varied in various predetermined patterns. Scanning of the beam can be effected by changing the frequency of observation without physically rotating the antenna. Also two simultaneous beams rotating in opposite directions with independent motions can be achieved.

13 Claims, 11 Drawing Sheets

FREQUENCY-SCANNING RADIOMETER

BACKGROUND OF THE INVENTION

1. Field of the Invention

This invention relates generally to electronically scanned radiometers and a method of operating these radiometers and more particularly to an apparatus and method for controlling the direction of receptivity of radiometric emissions and thereby utilizing the enhanced emission receptivity to improve the performance of the radiometer.

The invention further pertains to (a) electronically scanned arrays of radiation receptors; and (b) connection of the array to electronic systems which effect the electronic scan and processing the resultant detected radiation.

2. Description of the Prior Art

Radiometers are used in many applications to detect and process the naturally occurring emissions of objects whose temperature is above absolute zero. All objects at such temperature radiate low level electromagnetic signals across the whole frequency spectrum. Radiometers have the ability to detect these low level signals, process the signals and then display them in easily manageable form.

To display radiometrically derived signals, thereby creating a visual image of the scene in the field of view of the radiometer, requires a scanning of the radiometer's receiving beam in at least one plane. Scanning in the orthogonal plane is frequently achieved by means of the forward motion of the radiometer's support platform, for example, the forward motion of a satellite, a plane or a ship on which the radiometer is located.

In a typical example, the radiometer's receiving beam has a beamwidth of two degrees and is scanned over an angular range of ±40°. The central frequency of observation may typically be 37 GHz with a wider band observation extending to 1 GHz on either side of the central frequency. Scanning of the receiving beam is usually achieved by means of an auxilliary mechanism in which the radiometer's antenna, which forms the receiving beam, is physically rotated. The rotation may be a full 360° or extend only over the required range (in the present example +40°).

It is desirable to provide an electronic alternative to mechanical scanning, through physical rotation of the antenna, since mechanical mechanisms are liable to failure especially in the harsh environments in which radiometers are usually found. Furthermore, it would also be desirable to take advantage of the flexibility provided by electronic scanning to enhance the performance of the radiometer.

SUMMARY OF THE INVENTION

It is therefore an object of the invention to provide a radiometer in which scanning of the beam is effected by changing the frequency of observation in a systematic way such that a particular microwave structure can be used, without physically rotating the antenna.

It is a more specific object of the invention to use the natural constancy of radiometric flux of the electromagnetic emissions over the limited bandwidth of observation so that scanning of the receiving beam is controlled only by the frequency of the local oscillator employed in the conventional mixer downconversion process.

It is a further object of the invention to use the rate of change of the local oscillator frequency to compensate for variations in the beamwidth of the scanned receiving beam. By this means, it is possible to vary the flux integration time and hence the radiometric sensitivity.

It is a further object of the invention to use the principle of local oscillator control of the beam direction and the bidirectional properties of the radiometer's frequency-sensitive antenna to achieve two simultaneous beams, rotating in opposite directions with independent motions. In this way the total power received from one point in the field of view can be doubled, thus achieving an improvement in radiometer sensitivity.

It is a further object of the invention to use the two outputs from one point to enhance the detected output from the radiometer so that the radiometer behaves as if it embodied a double-sideband receiver rather than the conventional single sideband receiver, with consequent improvement in sensitivity.

A frequency-scanning radiometer for use in scanning a radiometric beam has a dispersive antenna with at least two ports. A mixer is connected to each port with each mixer being fed by a variable frequency local oscillator. The oscillator is connected to provide the mixer with a drive signal that varies in frequency, there being one mixer and one oscillator for each port. The antenna most efficiently receives at least two independent beams through radiators. Each beam is most efficiently received at an angle and a frequency that is completely independent of other beams, said angle varying with the frequency of the drive signal of the mixer. For that particular beam. Each beam produces an output at each port with means for detecting and displaying said output. Preferably the antenna is a serpentine. Still more preferably the antenna has two port and there are two mixers and two local oscillators, one mixer and one oscillator for each port.

A method of using a frequency-scanning radiometer having a serpentine antenna with two ports, a mixer being connected to each port, each mixer being fed by a variable frequency local oscillator, each oscillator being connected to provide the mixer for a particular port with a drive signal that varies in frequency, said serpentine having coupling means at each alternate bend to permit reception of a beam in four directions, two through each port, the antenna most efficiently receiving a particular beam at an angle that varies with the frequency of the drive signal to each mixer, one amplifier being connected to each mixer, each amplifier being connected to a detector, each detector being connected to a lowpass filter which in turn in connected to a single summing point which is connected to a single display, the method including operating the radiometer simultaneously at two orthogonal polarizations, operating the mixer for Port one so that the frequency varies from $(f_1+IF)$ to $(f_2+IF)$ where IF is the intermediate frequency of the radiometer and operating the mixer for Port two so that the frequency varies from approximately $(f_2+IF)$ to approximately $(f_1+IF)$, varying the frequency of the two mixers simultaneously over said ranges of frequency in a pre-determined pattern so that the sum of the frequency of the two mixers at any given time is $f_1+f_2+2IF$.

In a further method of using a frequency-scanning radiometer, the radiometer has a serpentine antenna with two ports. A mixer is connected to each port and each mixer is fed by a variable frequency local oscillator. The oscillator is connected to provide the mixer for a particular port with a drive signal that varies in frequency. The antenna most efficiently receives a beam through radiators at an angle that varies with the frequency of the drive signal of each mixer in three directions, one for each port. The radiometer has a display to review the results obtained. The method includes operating the mixer for Port one so that the frequency varies from ($f_1$+IF) to ($f_2$+IF) where IF is the intermediate frequency of the radiometer, operating the mixer for Port two so that the frequency varies from ($f_2$+IF) to ($f_1$+IF). The frequency is varied for the two mixers simultaneously over said ranges of frequency in a predetermined pattern so that the sum of the frequency of the two mixers at any given time is always equal to $F_1+f_2+2IF$ and the results are reviewed on the display.

BRIEF DESCRIPTION OF THE DRAWINGS

The invention will be better understood by an examination of the following description, together with the accompanying drawings, in which.

DESCRIPTION OF A PREFERRED EMBODIMENT

Figure 1:
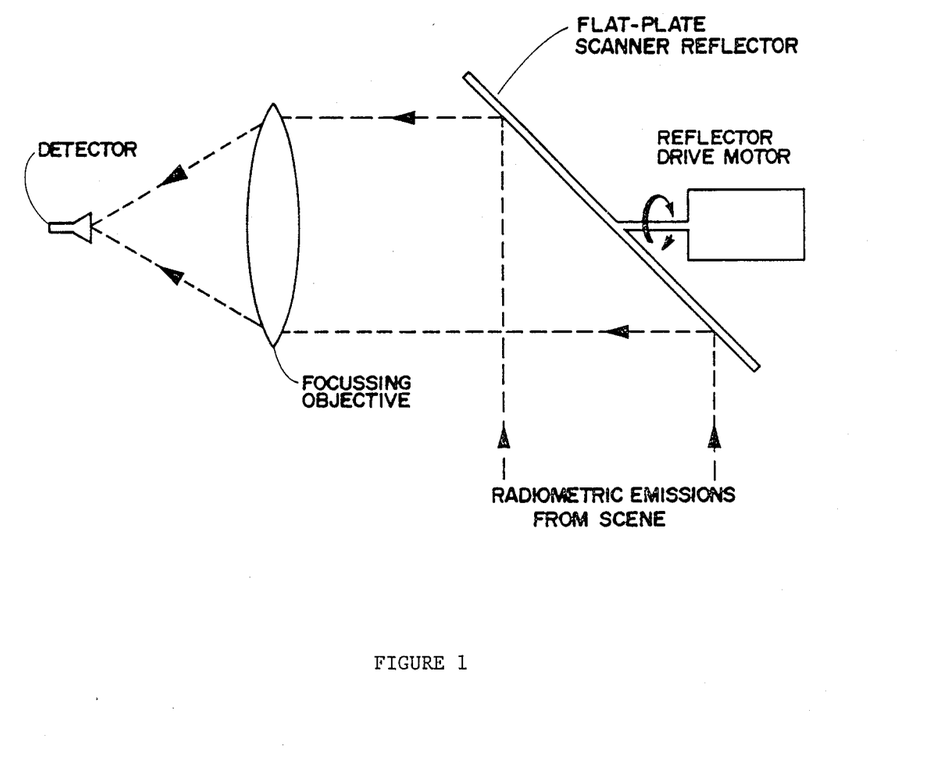
FIG. 1 is a schematic view of a typical mechanically scanning microwave radiometer arrangement of the prior art.

Referring to FIG. 1, a prior art scanning radiometer is illustrated. A focusing objective receives radiometric emissions reflected from a plane reflector which is inclined to 45° to the incoming radiation. The objective, which may be a lens as shown, or a parabolic reflector or other quasi-optical arrangement, focuses the radiation to the small area where a detector is placed. At millimeter wave frequencies, the detector may consist of a horn antenna and a mixer. Scanning of the radiometer is achieved by rotating the inclined plane mirror about an axis, as indicated in FIG. 1.

Figure 2A:
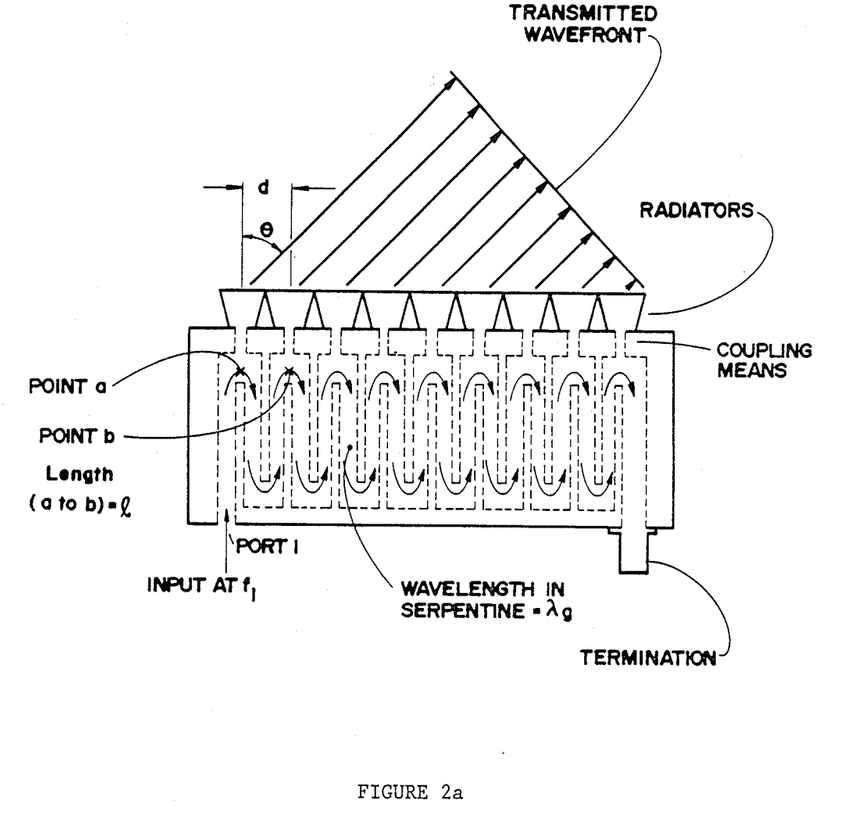
FIG. 2a is a schematic view of a one port high frequency dispersive serpentine arrangement used as an antenna in a radiometer.

A radiometer, in accordance with the present invention, uses a dispersive antenna to scan the radiometric beam, that is, more precisely, to scan the direction of sensitivity to radiometric emission. The dispersive antenna is preferably a frequency scanning antenna and, still more preferably a serpentine antenna as illustrated in FIG. 2a. It is simple to follow the operation of the serpentine by invoking the principle of reciprocity which states that the radiation characteristics of a transmitting antenna are identical but reversed in function to those of the same antenna when used as a receiving antenna. Consider, therefore, FIG. 2a as an illustration of a transmitting antenna. When a signal at a frequency $f_1$ is injected into Port one, the signal travels down the serpentine from which power is radiated at every alternate bend, as shown. The direction of radiation is determined by the existence and angle of a planar wave front leaving the series of radiating bends. At the frequency $f_1$, each radiating bend radiates with a phase dependent of the differential phase between adjacent elements. It can be shown that the phase difference between adjacent elements is $$\frac{2\pi l}{\lambda g} \text{ radians}$$

when $l$ is the length of a single loop, and $\lambda g$ is the wavelength in the particular medium, for example waveguide. If the separation between adjacent bends is $d$, then it can be shown that the radiated beam maximum occurs at an angle given by $$\theta = \arcsin\left[\frac{l}{\lambda g} - n\right] \cdot \frac{2\pi}{d}$$

where n is the number of whole wavelengths in the quotient $l/\lambda g$.

It is evident that $\theta$ is a function of $\lambda g$ and hence of frequency. By the principle of reciprocity, the serpentine array will, at a frequency $f_1$, receive most efficiently through the radiators from the direction $\theta_1$. At a different frequency $f_2$, the serpentine array will receive most efficiently from another direction $\theta_2$.

Figure 2B:
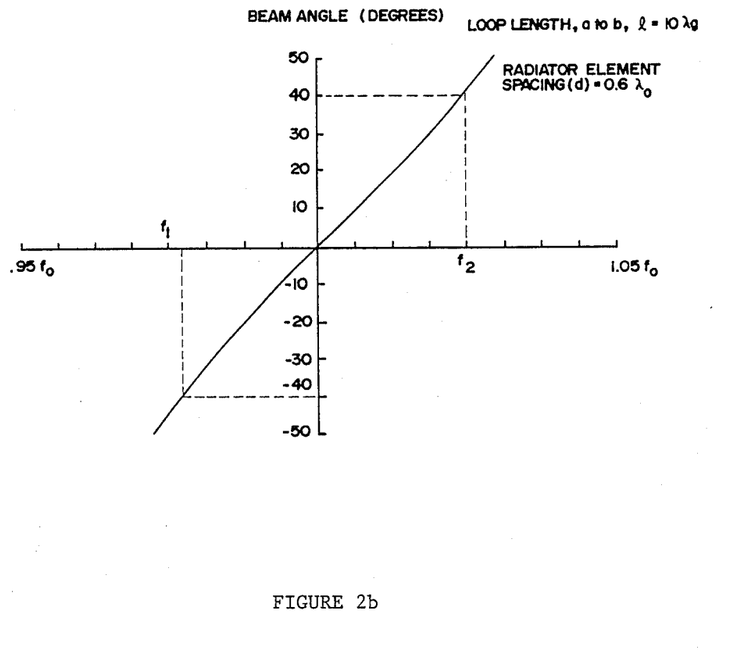
FIG. 2b is a graph showing how beam direction varies as a function of observation frequency.

FIG. 2b illustrates for a particular value of $d=0.6\lambda o$, where $\lambda o$ is the wavelength at the centre frequency $f_o$, how the serpentine's direction of best reception changes as a function of frequency. Making allowance for the physical phenomenon of grating lobes which constrains the maximum scan angle in one direction, it is evident from the preferred embodiment illustrated by FIGS. 2a and 2b that, by changing the frequency of observation of incoming radiometric emission from $f_1$ through $f_o$ to $f_2$, a beam direction change of 80° can be achieved.

Figure 3A:
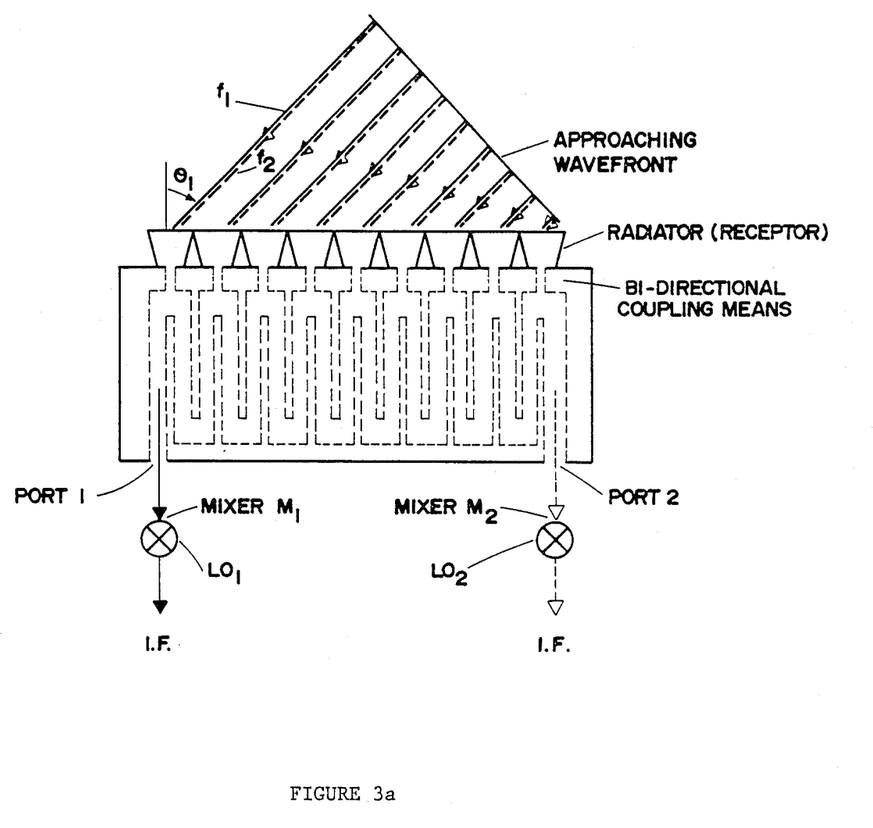
FIG. 3a is a schematic view of a two port serpentine utilized to permit dual reception simultaneously from the two different ports.

In FIG. 3a, there is shown a preferred embodiment, with a two port serpentine radiometer antenna using non-directional coupling mechanisms and with two mixers, one at each end. Mixer M1 is connected to a local oscillator LO$_1$, which provides a mixer driver signal whose frequency varies from ($f_1$+IF) to ($f_2$+IF) where IF is the intermediate frequency of the radiometer. Likewise Mixer M2 is connected to a local oscillator LO$_2$ which provides a mixer driver signal whose frequency varies from approximately ($f_2$+IF) to approximately ($f_1$+IF). The exact frequencies and rate and manner of variation between these two limits are preferably chosen so that, at frequency $f_1$, Mixer M1 observes radiometric emission from direction $\theta_1$ and, at frequency approximately $f_2$, Mixer M2 also observes radiometric emission from direction $\theta_1$. Other simultaneous but non-coincident beam positions are also possible by using staggered Local Oscillator frequencies. Double sideband techniques are also feasible. Many combinations of radiometer frequency, LO frequency and IF are self-evident to those experienced in receiver design. By appropriate use of microwave devices such as isolators or amplifiers, it is possible to ensure that reflections from the two mixers are controlled to an insignificant level, thus ensuring proper operation of the serpentine.

Figure 3B:
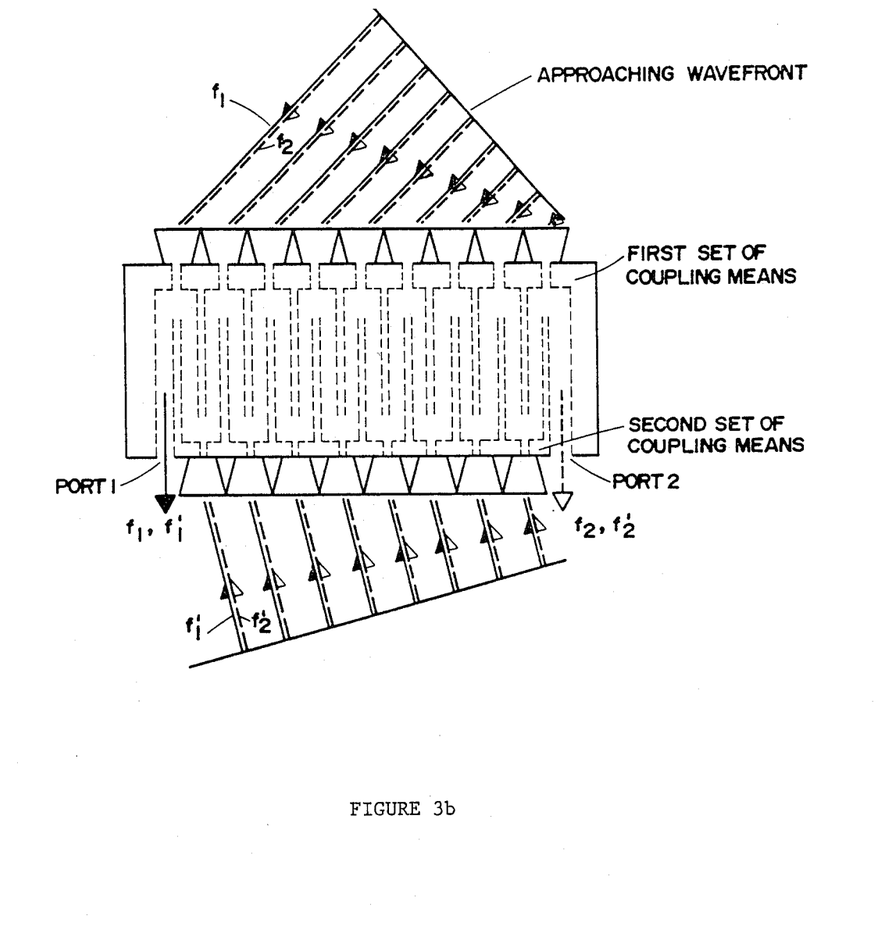
FIG. 3b is a schematic view of a two port serpentine with coupling means utilized to permit quadruple reception simultaneously from two different ports.

By attaching coupling means at each bend of the serpentine as indicated in FIG. 3b, it is also possible to permit reception in a further two directions through Ports one and two as indicated at frequencies $f_1$ and $f_2$. By suitable diplexing means, it is possible to use sectors, different frequencies or bands of frequencies to cover different scans.

Figure 4A:
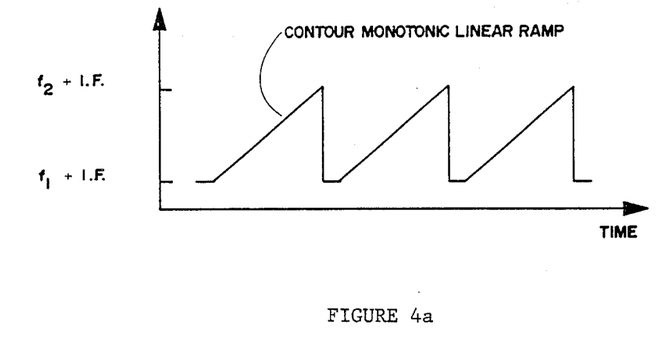
FIG. 4a is a representation of a means of changing a local oscillator frequency so as to effect a change in the direction of radiometer sensitivity.
Figure 4B:
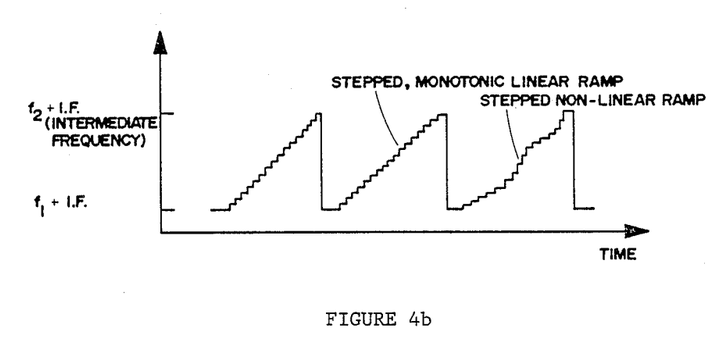
FIG. 4b is a representation of another means of changing a local oscillator frequency so as to effect a change in the direction of radiometer sensitivity.
Figure 5:
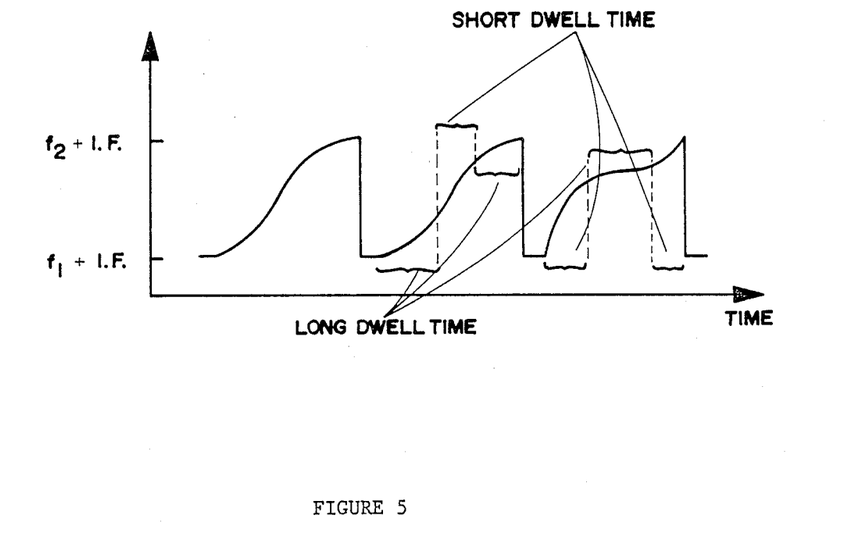
FIG. 5 is a graph showing how control of the rate of change of local oscillator frequency permits control of integration time.

Also in accordance with the present invention, FIGS. 4a and 4b illustrate how the LO frequency can be controlled so that the angular position of the radiometric beams can be varied in continuous linear, stepwise, or variable rate. These techniques permit a wide range of compensation, dwell times and resolutions to be envisaged in a single sweep of the frequency range, as illustrated by FIG. 5. It can be seen that regions of low scan rate are produced by low rates of change of LO frequency, corresponding to long dwell times. Conversely, high slopes correspond to short dwell times.

Figure 6:
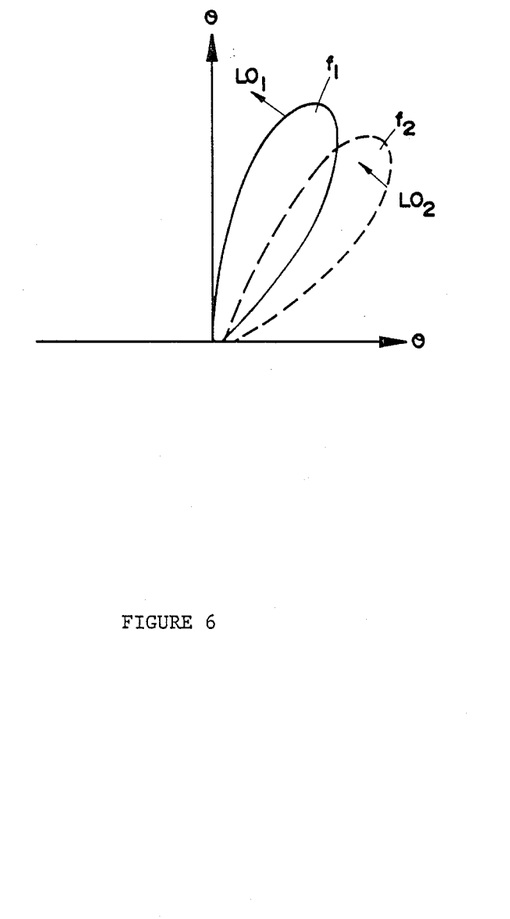
FIG. 6 shows the generation of two beams in a monopulse-type pair.

In FIG. 6, there is shown how an offset in the frequency sweep of one local oscillator gives rise to a monopulse-type pair of beams which can be used for search purposes in locating with high accuracy the position of an active emitter, for example, a rescue beacon.

Figure 7:
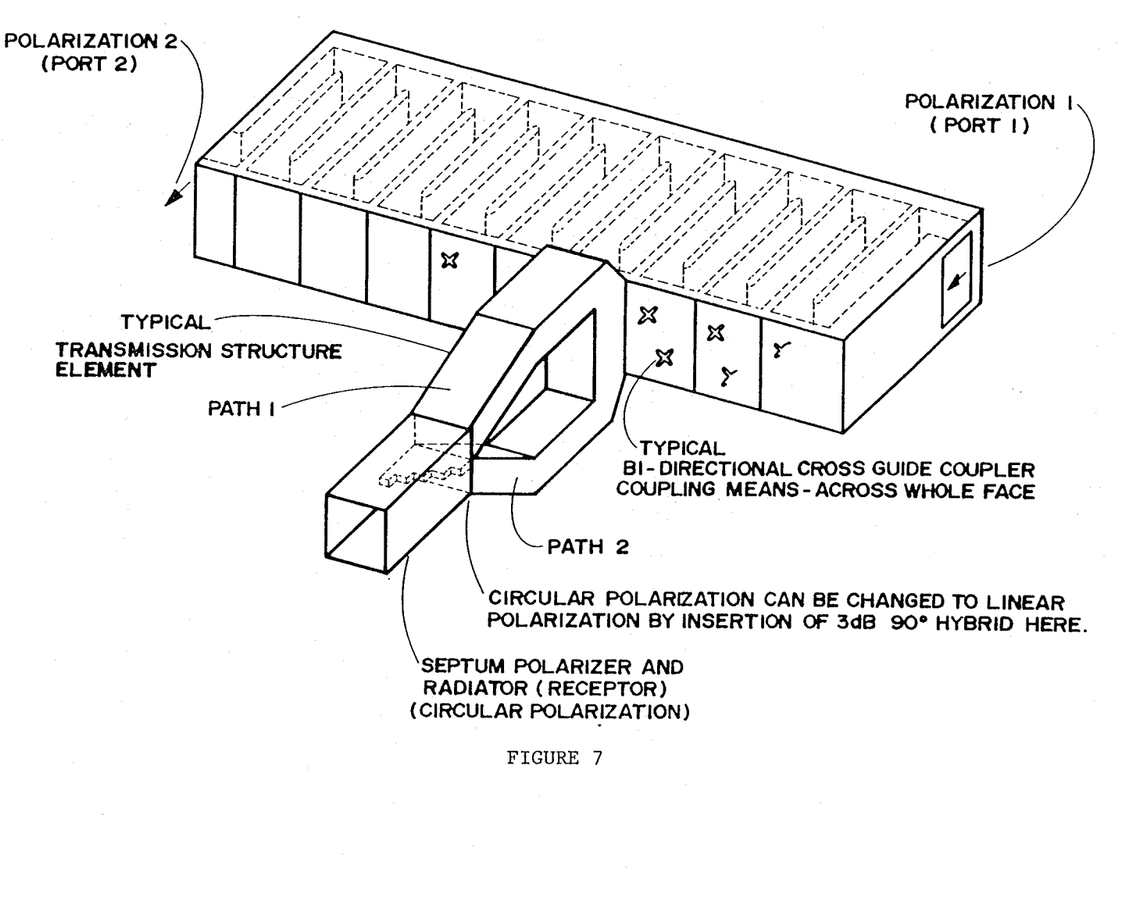
FIG. 7 is a partial perspective view of a two port serpentine with coupling means and a transmission structure element attached to one loop.

Since radiometric emission is polarization dependent, it is useful to operate the radiometer simultaneously at two orthogonal polarizations. FIG. 7 illustrates a means for achieving such operation. For ease of illustration, the coupling means is shown on only a few of the loops of the serpentine when in fact it is on every loop. For the same reason, only one transmission structure element or radiator is shown when in fact each loop would have a radiator installed. As previously described in FIG. 3, two ports, one at each end of the serpentine, can be accessed. If, at each alternate bend, a directional coupling means can be attached to join the serpentine to the radiator as shown in FIG. 7, then, signals injected into Port one will sequentially couple through the directional coupling means and pass through Paths one of the successive networks to the radiators. The network, as shown, consisting of a loop of waveguide and an in-line polarizer, will produce a left-hand circularly polarized wave and little or no right-hand circular polarized wave. Other equivalent networks within the scope of the attached claims, can be easily envisaged to accomplish this objective. In the case of linear polarization, for example, a 3 dB 90° coupler could be used to couple together Paths one and two in which case linear polarization with little or no orthogonal polarization would be radiated. Likewise, signals injected into Port two would emerge via Path two from the radiating aperture as a right-hand circularly polarized wave with little or no left-hand circularly polarized wave.

Figure 8:
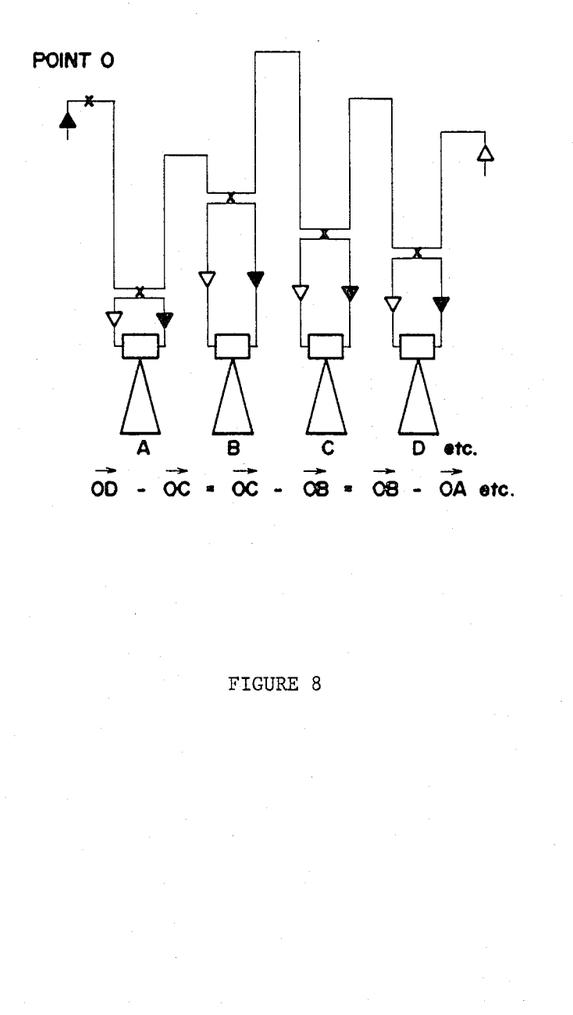
FIG. 8 is a schematic view showing how the serpentine structure can be adjusted to minimize the interaction of reflections, so permitting the antenna to scan through the normal.

In a regularly spaced serpentine as illustrated by FIG. 7, in which each loop of transmission line between a pair of radiating apertures is equal to any other, there exists a condition in which all the internal reflections add at the input port. This occurs when the frequency is such that the beam would be generated normal to the serpentine face. By adopting the technique illustrate by FIG. 8, which is a schematic representation of a part of FIG. 7, it is possible to ensure that the reflections arising from the bends always add randomly at the input port. FIG. 8 shows how the length of the bends are staggered, so that each loop has a different length, thus causing the reflections to have random phases with respect to one another. At the same time, the different loop lengths are compensated by the insertion of extra lengths of transmission line near the radiator. Reflections from the transmission line structures are in phase at the frequency corresponding to the normal beam, but are strongly attenuated by the directional coupling means shown in both FIGS. 7 and 8.

Figure 9:
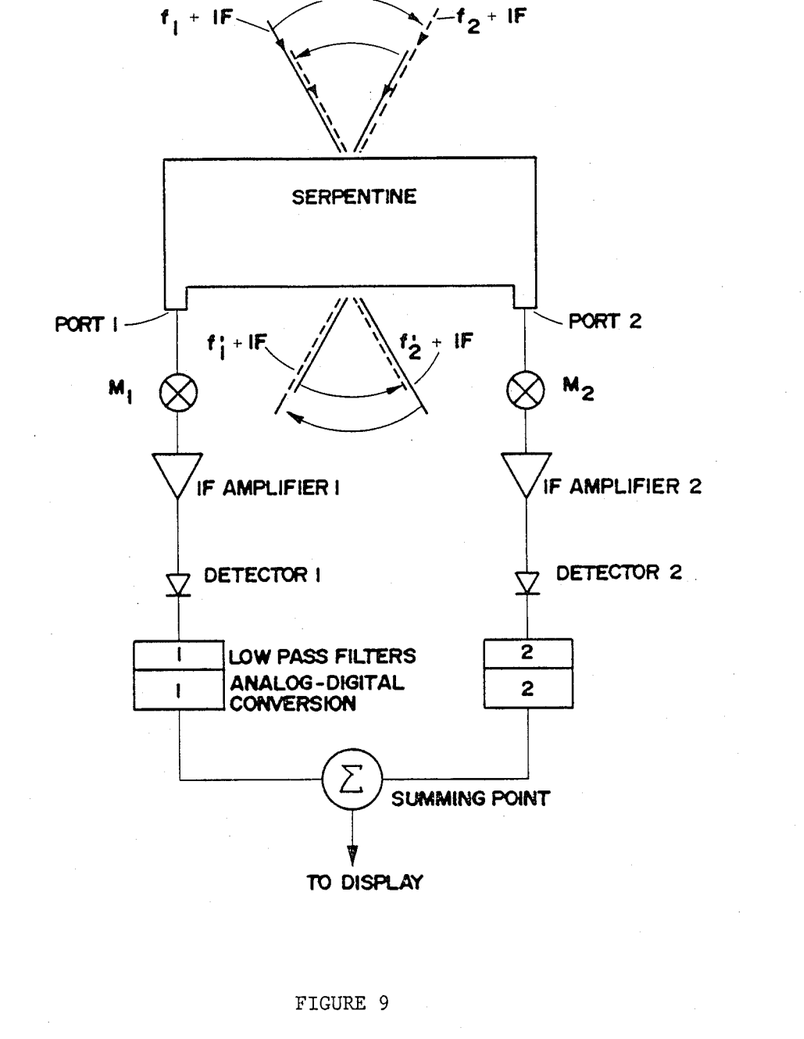
FIG. 9 is a block diagram of the operation of a frequency-scanning radiometer, having two ports and permitting reception in four directions.

Referring to FIG. 9, this illustration shows a block diagram of a radiometer which embodies the above principles, in accordance with the present invention.

Since radiometric emissions at the two frequencies $f_1$ and approximately $f_2$ are noise power signals and are uncorrelated, it is possible to add the two contributions at the intermediate frequency, thereby nearly doubling the radiometer accuracy. With this enhancement it is possible to make other trade-off arrangements. For example, it is possible to halve the IF bandwidth, thereby improving the angular resolution of the frequency-scanning radiometer, or the sweep rate could be doubled thus permitting faster survey of a scene from an aircraft, or the dwell time can be changed in a predetermined or systematic manner to accommodate, for example, changes in the mounting platform attitude, as in a cross-track compensation for roll motion of the aircraft or ship on which the radiometer is mounted. Other trade-offs are equally obvious to the antenna and radiometry expert.

Although particular embodiments have been illustrated, this was for the purpose of describing, but not limiting, the invention. Various modifications which will come readily to mind in one skilled in the art, are within the scope of the invention as defined in the approved claims.

What is claimed is:

1. A frequency-scanning radiometer for use in scanning a radiometric beam, said radiometer comprising a dispersive antenna, with at least two ports, a mixer being connected to each port, each mixer being fed by a variable frequency local oscillator, said oscillator being connected to provide the mixer with a drive signal that varies in frequency, there being one mixer and one oscillator for each port, the antenna most efficiently receiving at least two independent beams simultaneously through radiators, each beam being most efficiently received at an angle and a frequency that is completely independent of other beams, said angle varying with the frequency of the drive signal of the mixer for that particular beam, each beam producing an output at each port, with means for detecting and displaying said output.

2. A radiometer as claimed in claim 1 wherein the antenna is a frequency-scanning antenna.

3. A radiometer as claimed in claim 1 wherein the antenna is a serpentine.

4. A radiometer as claimed in any one of claims 1, 2 or 3 wherein the antenna has two ports.

5. A radiometer as claimed in any one of claims 1, 2 or 3 wherein the means for detecting and displaying the output from each port is one amplifier connected to each mixer, each amplifier being connected to a detector, each detector being connected to a single display.

6. A radiometer as claimed in claim 3 wherein the serpentine has a plurality of loops, with each loop having a different length, the different loop lengths being compensated for by extra lengths of transmission line inserted near each radiator.

7. A radiometer as claimed in any one of claims 1, 2 or 3 wherein the means for detecting and displaying the output from each port is one amplifier connected to each mixer, each amplifier being connected to a detector, each detector being connected to a lowpass filter which in turn is connected to a single summing point connected to a single display, there being one amplifier for each port and one detector for each port but only one summing point and only one display.

8. A radiometer as claimed in any one of claims 1, 2 or 3 wherein the means for detecting and displaying the output from each port is one amplifier connected to each mixer, each amplifier being connected to a detector, each detector being connected to an analog digital conversion which in turn is connected to a single summing point connected to a single display, there being one amplifier for each port and one detector for each port but only one summing point and only one display.

9. A method of using a frequency-scanning radiometer having a serpentine antenna with two ports, a mixer being connected to each port, each mixer being fed by a variable frequency local oscillator, each oscillator being connected to provide the mixer for a particular port with a drive signal that varies in frequency, said serpentine having coupling means at each alternate bend to permit reception of a beam in four directions, two through each port, the antenna most efficiently receiving a particular beam at an angle that varies with the frequency of the drive signal to each mixer, one amplifier being connected to each mixer, each amplifier being connected to a detector, each detector being connected to a lowpass filter which in turn is connected to a single summing point which is connected to a single display, said method comprising operating the radiometer simultaneously at two orthogonal polarizations, operating the mixer for Port one so that the frequency varies from $(f_1+IF)$ to $(f_2+IF)$ where IF is the intermediate frequency of the radiometer and operating the mixer for Port two so that the frequency varies from approximately $(f_2+IF)$ to approximately $(f_1+IF)$, varying the frequency of the two mixers simultaneously over said ranges of frequency in a pre-determined pattern so that the sum of the frequency of the two mixers at any given time is always equal to $f_1+f_2+2IF$.

10. A method of using a frequency-scanning radiometer having a serpentine antenna with two ports, a mixer being connected to each port, each mixer being fed by a variable frequency local oscillator, each oscillator being connected to provide the mixer for a particular port with a drive signal that varies in frequency, the antenna most efficiently receiving a beam through radiators at an angle that varies with the frequency of the drive signal to each mixer, in two directions, one for each port, the radiometer having a display to view the results obtained, said method comprising operating the mixer for Port one so that the frequency varies from $f_1+IF$ to $(f_2+IF)$ where IF is the intermediate frequency of the radiometer and operating the mixer for Port two so that the frequency varies from $f_2\pm IF)$ to $(f_1+IF)$, varying the frequency of the two mixers simultaneously over said ranges of frequency in a pre-determined pattern so that the sum of the frequency of the two mixers at any given time is always equal to $f_1+f_2+2IF$, and reviewing the results shown on the display.

11. A method as claimed in claim 10 wherein the frequency is varied in a stepped monotonic linear ramp.

12. A method as claimed in claim 10 wherein the frequency is varied in a contour monotonic linear ramp.

13. A method as claimed in claim 10 wherein the frequency is varied in a stepped non-linear ramp.

* * * * *